US008924557B2

(12) United States Patent
Livne et al.

(10) Patent No.: US 8,924,557 B2
(45) Date of Patent: Dec. 30, 2014

(54) SYSTEM AND METHOD FOR SUPPORTING SESSION THRESHOLD FOR IMS SCIM/SERVICE BROKERING

(75) Inventors: Shlomo Livne, Ra'anana (IL); Dima Polsky, Jerusalem (IL); Vladimir Furman, Givaat-Ada (IL); Renana Seidman, Ra'anana (IL); Avi Zohary, Rosh-Haain (IL); Yoel Amram, Rechovot (IL); Amnon Heiman, Tel-Aviv (IL); Nadav Kadosh, Givaataim (IL); Tzach Livyatan, Tel-Aviv (IL)

(73) Assignee: Oracle International Corporation, Redwood Shores, CA (US)

( * ) Notice: Subject to any disclaimer, the term of this patent is extended or adjusted under 35 U.S.C. 154(b) by 324 days.

(21) Appl. No.: 13/584,459

(22) Filed: Aug. 13, 2012

(65) Prior Publication Data
US 2014/0047044 A1 Feb. 13, 2014

(51) Int. Cl.
G06F 15/173 (2006.01)

(52) U.S. Cl.
USPC .......................................... 709/225

(58) Field of Classification Search
None
See application file for complete search history.

(56) References Cited

U.S. PATENT DOCUMENTS

| | | | |
|---|---|---|---|
| 6,760,417 B1 | 7/2004 | Wallenius | |
| 7,136,913 B2 | 11/2006 | Linderman | |
| 7,483,438 B2 | 1/2009 | Serghi et al. | |
| 7,995,990 B1 * | 8/2011 | Andreasen et al. | 455/408 |
| 8,102,981 B2 * | 1/2012 | Cai | 379/114.14 |
| 8,296,409 B2 | 10/2012 | Banerjee et al. | |
| 2002/0025795 A1 | 2/2002 | Sharon et al. | |
| 2003/0028790 A1 | 2/2003 | Bleumer et al. | |
| 2003/0115078 A1 * | 6/2003 | Young | 705/1 |
| 2004/0009762 A1 | 1/2004 | Bugiu et al. | |
| 2005/0245230 A1 | 11/2005 | Benco et al. | |
| 2007/0106801 A1 | 5/2007 | Jansson | |
| 2007/0143470 A1 | 6/2007 | Sylvain | |

(Continued)

OTHER PUBLICATIONS

Gouya, A., Crespi, N., Bertin, E., & Oueslati, L. (Jul. 2006). Managing Service Capability and Service Feature Interactions in the IMS of UMTS. In Networking and Services, 2006. ICNS'06. International conference on (pp. 50-56). IEEE.*
Handling, IP Multimedia IMS Session, and IP Multimedia IM Call Model. "All-IP Core Network Multimedia Domain."*

(Continued)

Primary Examiner — Scott Christensen
Assistant Examiner — Sean Concannon
(74) Attorney, Agent, or Firm — Meyer IP Law Group

(57) ABSTRACT

In accordance with various embodiments, systems and methods that integrate threshold management into a SCIM/Service Broker are provided. Such a system can include a plurality of applications, executing on one or more application servers. The system can also include a SCIM/Service Broker which is operable to manage a threshold set by the applications. Each application can determine an application threshold, a current threshold and a met threshold. When an application receives a message from the SCIM/Service Broker, the application can determine if the met threshold exists and, if the met threshold exists, update the application threshold accordingly. The application can also determine if the application threshold has been met, and if the application threshold has been met, execute business logic associated with the application threshold and set a new application threshold. The application sends a request to SCIM/Service Broker requesting a new current threshold value be set.

20 Claims, 4 Drawing Sheets

(56) References Cited

U.S. PATENT DOCUMENTS

| | | | |
|---|---|---|---|
| 2009/0210534 A1* | 8/2009 | O'Connell | 709/226 |
| 2009/0268715 A1 | 10/2009 | Jansson | |
| 2011/0082920 A1 | 4/2011 | Bhattacharya et al. | |
| 2012/0084168 A1* | 4/2012 | Adair et al. | 705/26.3 |
| 2013/0132590 A1* | 5/2013 | Levenshteyn et al. | 709/227 |
| 2008/0260119 A1* | 10/2008 | Marathe et al. | 379/93.01 |
| 2009/0193131 A1* | 7/2009 | Shi | 709/229 |
| 2007/0201665 A1* | 8/2007 | Kocan et al. | 379/201.02 |
| 2008/0103923 A1 | 5/2008 | Rieck et al. | |

OTHER PUBLICATIONS

Stuart Walter, and Ian Jenkens. "IA for R4 ISC Interface." Aug. 27, 2008.*
BEA, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, ORACLE, 94 pages, Jan. 2009.

\* cited by examiner

SYSTEM AND METHOD FOR SUPPORTING SESSION THRESHOLD FOR IMS SCIM/SERVICE BROKERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to an application orchestration using an orchestration engine and in particular to a system and method for supporting session threshold for IMS SCIM/service brokering.

BACKGROUND

Orchestration engines, such as a Service Control Interaction Management (SCIM) enable users to use multiple applications from multiple vendors to create custom solutions, without tying the user to a particular vendor for all applications and services. Typically, applications managed by the SCIM are not aware of each other. One issue with SCIMs that pass application threshold requests via the control path is that every time one application sets a threshold, or similarly, updates or deletes a threshold, all of the other applications being managed by the SCIM are notified. This constant updating wastes system resources, and becomes increasingly problematic as the complexity of the system, and the number of applications being managed, increases.

SUMMARY

In accordance with various embodiments, systems and methods that integrate threshold management into a SCIM are provided. Such a system can include a plurality of applications, executing on one or more application servers. The system can also include a SCIM which is operable to manage a threshold set by the applications. Each application can determine an application threshold, a current threshold and a met threshold. When an application receives a message from the SCIM, the application can determine if the met threshold exists and, if the met threshold exists, update the application threshold accordingly. The application can also determine if the application threshold has been met, and if the application threshold has been met, execute business logic associated with the application threshold, and if the application threshold has not been met, send a request to the SCIM requesting a new current threshold value be set.

Embodiments of the present invention enable multiple applications orchestrated on a chain to be unaware of each other and at the same time have as many thresholds as needed. The applications can use a single threshold request and abide by a rule that applications will update the current threshold request if, and only if, their request is lower than the current threshold, and therefore more urgent. By having such a contract, applications do not need the ability to cancel/update different thresholds. Thus, multiple applications from multiple vendors can be used in a single chain and provide each application with access to set a threshold on the network session.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Figure 1:
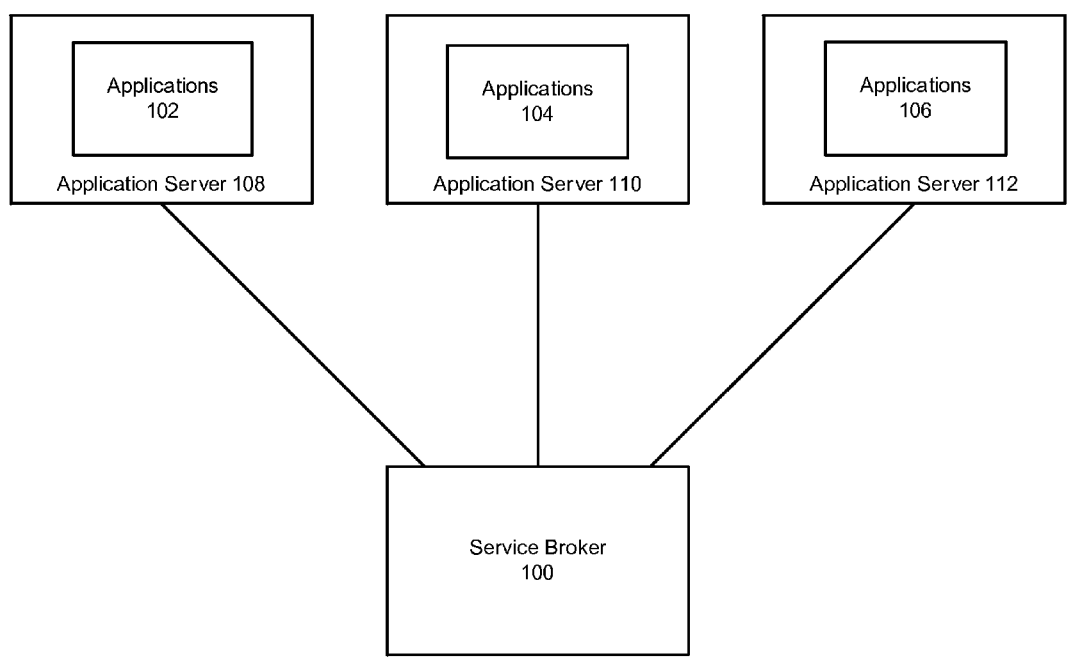
FIG. 1 shows a Service Control Interaction Management (SCIM)/Service Broker, in accordance with an embodiment of the invention.

FIG. 1 shows a Service Control Interaction Management (SCIM)/Service Broker, in accordance with an embodiment of the invention. The SCIM 100 can orchestrate, or chain together, multiple applications 102-106 across different application servers 108-112. Each of the plurality of application servers can include a plurality of applications. SCIM orchestration is done according to the signaling from the network.

Charging-aware applications use charging information (e.g., allocated units and used units) and network information (e.g., location, usage etc.) to determine thresholds to set. These thresholds can be used to invoke particular business logic when a threshold is met. For example, an SMS message can be sent to a user after a particular amount of data has been used, alerting the user that the user is low on data balance. The SCIM/Service Broker 100 enables multiple charging aware applications to be grouped into a single session in a manner such that they are unaware of each other. Mapping multiple application thresholds onto a single session in the network is a complex task (especially in cases where the network monitors usage to signal if a threshold was reached and the protocols do not support setting multiple thresholds, e.g., monitor data usage).

A solution that enables applications provide their thresholds and sort through the thresholds to apply the most "urgent" one can present a number of challenges. Such a solution must allow applications a method to update/delete their threshold requests (for example an application's thresholds may vary with the user's location, such that if the user is at home one threshold is applied whereas if the user is not at home a different threshold is applied). Additionally, the solution needs to take into account the fact that a set of thresholds monitoring the same unit (e.g., data or time) affect one another. For example, given a threshold for data usage, a threshold of 2 KB and a threshold of 15 KB, the solution needs to set the threshold to 2 KB and update the 15 KB threshold to be a threshold of 13 KB.

Currently, there is no contract or set of operations available over the SCIM to allow an application to request a threshold and notify all of the applications of that request. As noted above, typically applications are not aware of each other and the applications generally send all of their thresholds. In accordance with an embodiment of the invention, the SCIM can be extended to manage each application's threshold and notify each application as thresholds are met. When messages are sent to an application, the application can determine what the current threshold is and, if that application needs a lower threshold, set the current threshold to the lower threshold. If, however, the application wants to set a higher threshold, the application will not be able to change the current threshold. For example, if a first application sets the threshold to 10 KB, and a second application wants to set a threshold of 5 KB, then the second application can set the threshold to 5 KB. However, if a third application then wants to set the threshold to 15 KB, then the third application will not be allowed to change the threshold.

When a threshold is met, the SCIM can notify each application. At that time, each application can request that a new threshold be set. For example, once the 5 KB threshold has been met, the first application that requested 10 KB is notified that 5 KB has been consumed and the first application can request that the new threshold be set to 5 KB. Similarly, the second application is notified that the 5 KB threshold has been met and the second application can then check whether a new threshold should be set. This process continues with each application being managed by the SCIM. Thus, each application can set as many thresholds as needed, and each application will be notified when a threshold has been met.

Figure 2A:
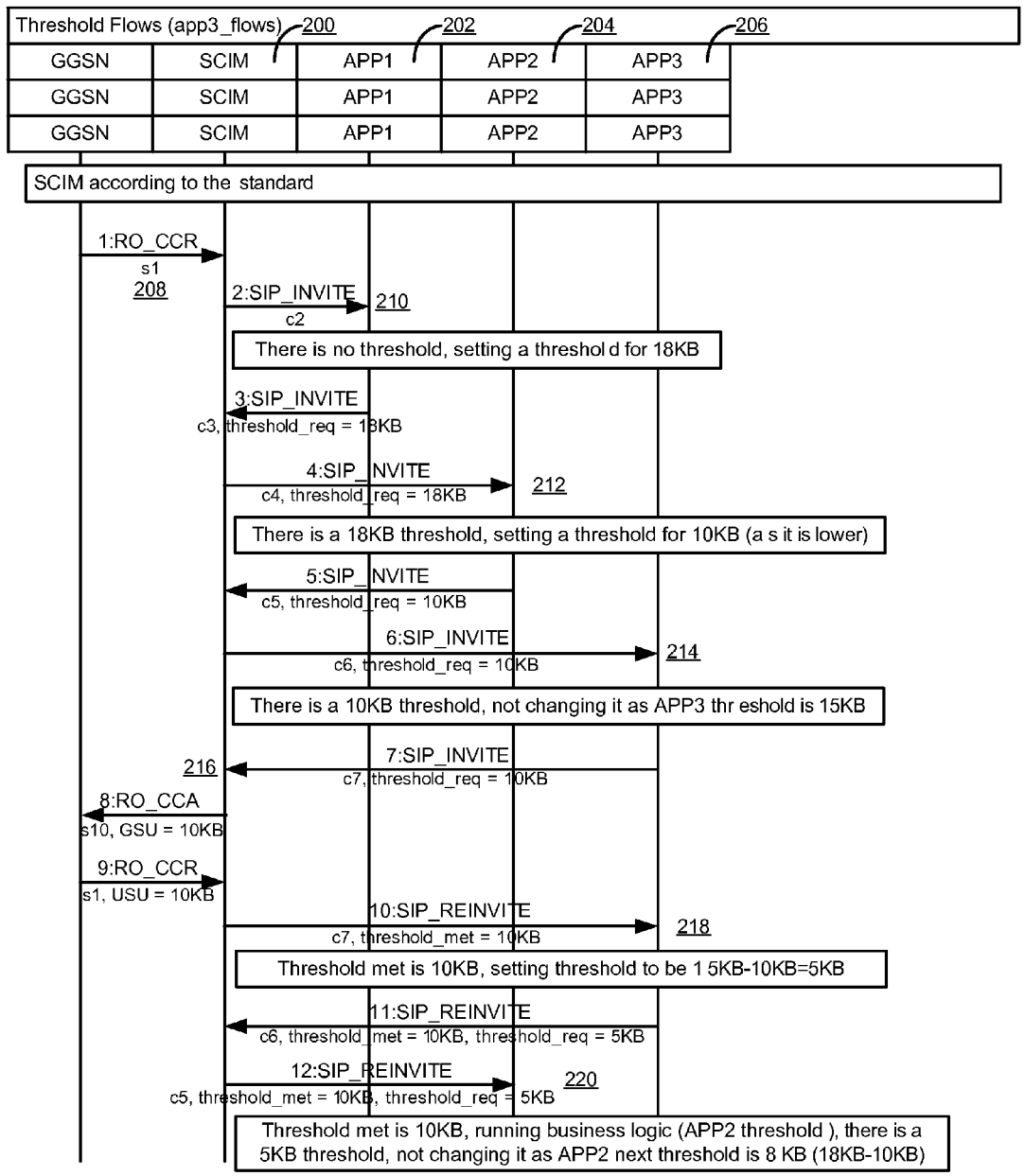
FIGS. 2A and 2B show an example of thresholds for use in charging, in accordance with an embodiment of the invention.
Figure 2B:
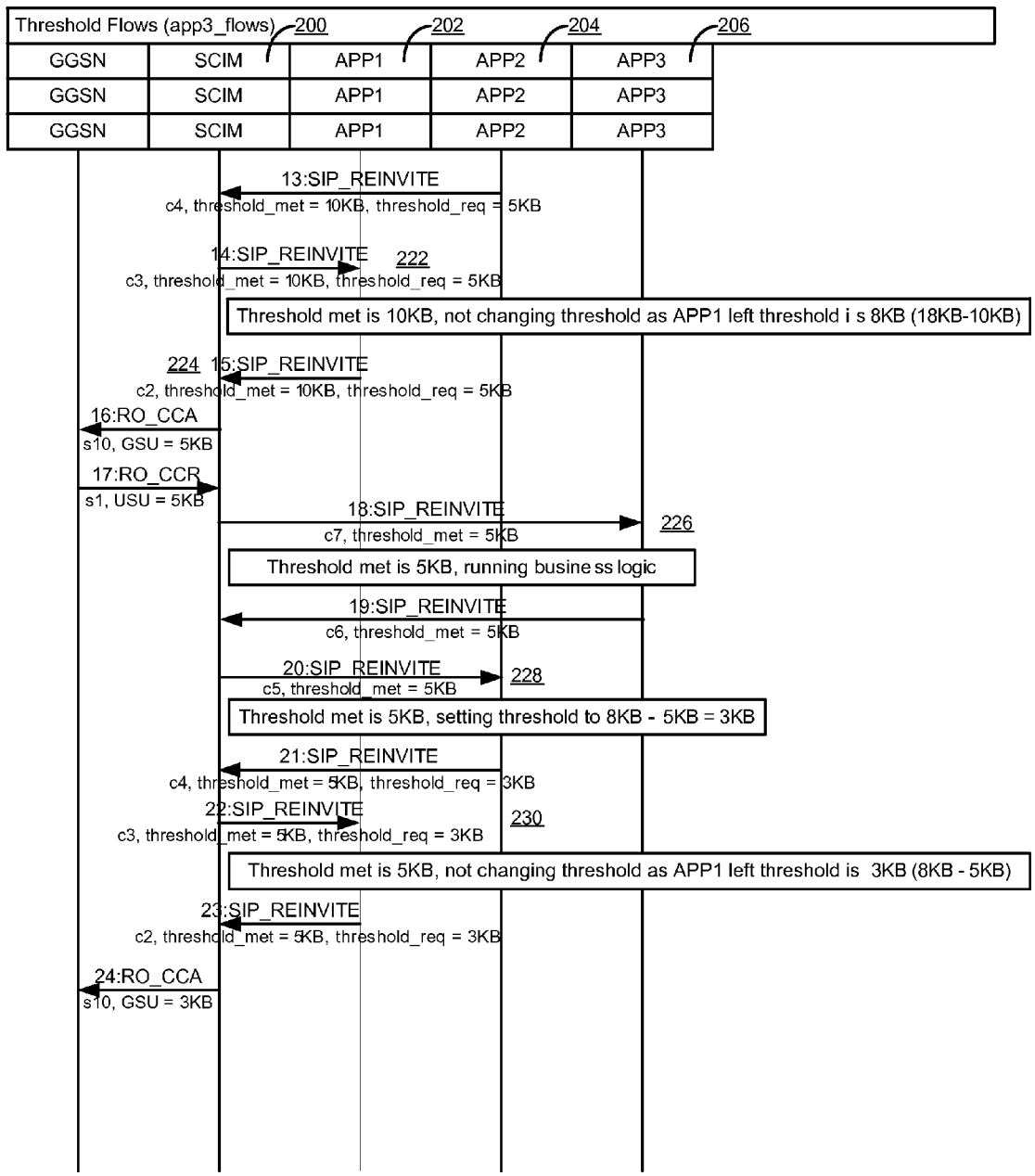

FIGS. 2A and 2B show an example of thresholds for use in charging, in accordance with an embodiment of the invention. FIGS. 2A and 2B show an example of Ro charging over GGSN which involves three applications managed by SCIM 200. APP1 202, which has a threshold of 18 KB, APP2 204, which has thresholds of 10 KB and 18 KB, and APP3 206 which has a threshold of 15 KB. At 208, the SCIM begins managing Ro charging. At 210, an INVITE is sent to APP1 202 which responds with a threshold request of 18 KB. At 212, an INVITE which indicates that the current threshold requested is for 18 KB is sent to APP2 204. Since APP2's first threshold is lower than the current threshold, APP2 responds with a request for its first threshold of 10 KB. At 214, an INVITE indicating that the current threshold is 10 KB is sent to APP3 206. Since the current threshold of 10 KB is lower than APP3's threshold of 15 KB, APP3 does not change the threshold.

At 216, 10 KB is consumed and the SCIM 200 is notified. At 218, a REINVITE message is sent to APP3 206, which indicates that the current threshold of 10 KB has been met. Since APP3 206 has a threshold of 15 KB, APP3 needs to be notified when another 5 KB has been consumed. Accordingly, APP3 206 can respond with a request for a new threshold of 5 KB. At 220, APP2 204 is notified that its first threshold has been met. APP2 204 then runs business logic associated with that threshold (e.g., sending an SMS, playing an announcement, etc.). APP2's next threshold is for 8 KB which is higher than the current threshold. As such, APP2 204 does not request a new threshold value. At 222, a REINVITE message is sent to APP1 202. APP1 202 has a threshold of 18 KB, and since 10 KB have now been consumed, APP1 needs to be notified after another 8 KB have been consumed. Since 8 KB is larger than the current threshold of 5 KB, no changes to the current threshold are made. At 224, 5 KB are consumed and the SCIM 200 is notified. As before, the SCIM 200 notifies each application in turn that the current threshold of 5 KB has been met. At 226, APP3 206 is notified that its threshold has been met and business logic associated with that threshold is executed. If APP3 206 has a new threshold, then APP3 can request the new threshold, however in the example of FIGS. 2A and 2B, APP3 does not request a new threshold value. At 228, APP2 204 is notified that the current 5 KB threshold has been met and APP2 determines that a new threshold of 3 KB needs to be set. Similarly, at 230, APP1 202 is notified that the current 5 KB threshold has been met and APP1 also determines a threshold of 3 KB. So no changes to the current threshold are needed.

Although not shown, once the 3 KB threshold has been met, each application will again be notified and APP2 204 and APP1 202 will each execute business logic associated with their thresholds. Additionally, even though APP3 206 is not waiting for a threshold to be met, APP3 will still be notified as thresholds are met. Each notification can include information in addition to the threshold information, for example the notification can include location or quality of service data, which can be used by the application to determine whether a new threshold should be requested.

In accordance with an embodiment of the invention, each application can track the application's threshold (APP_THRESHOLD), the current threshold (THRESHOLD_REQ), and the threshold that was most recently met (THRESHOLD_MET). Using this information, if APP_THRESHOLD exists, then each application can perform at least the following steps:

1. If THRESHOLD_MET exists, then the application's threshold can be updated according to: APP_THRESHOLD=APP_THRESHOLD—THRESHOLD_MET. Thus, the application's threshold is reduced by the amount of the threshold that was just met.

2. If APP_THRESHOLD=0 then:
  a. the application can execute the business logic associated with that threshold, and
  b. APP_THRESHOLD can be set to the next threshold value for that application, if there is a next threshold value.

3. If APP_THRESHOLD>0 then:
  a. The application can request the new threshold be set to the application threshold, if the application threshold is less than the current threshold: THRESHOLD_REQ=min(THRESHOLD_REQ, APP_THRESHOLD).

Figure 3:
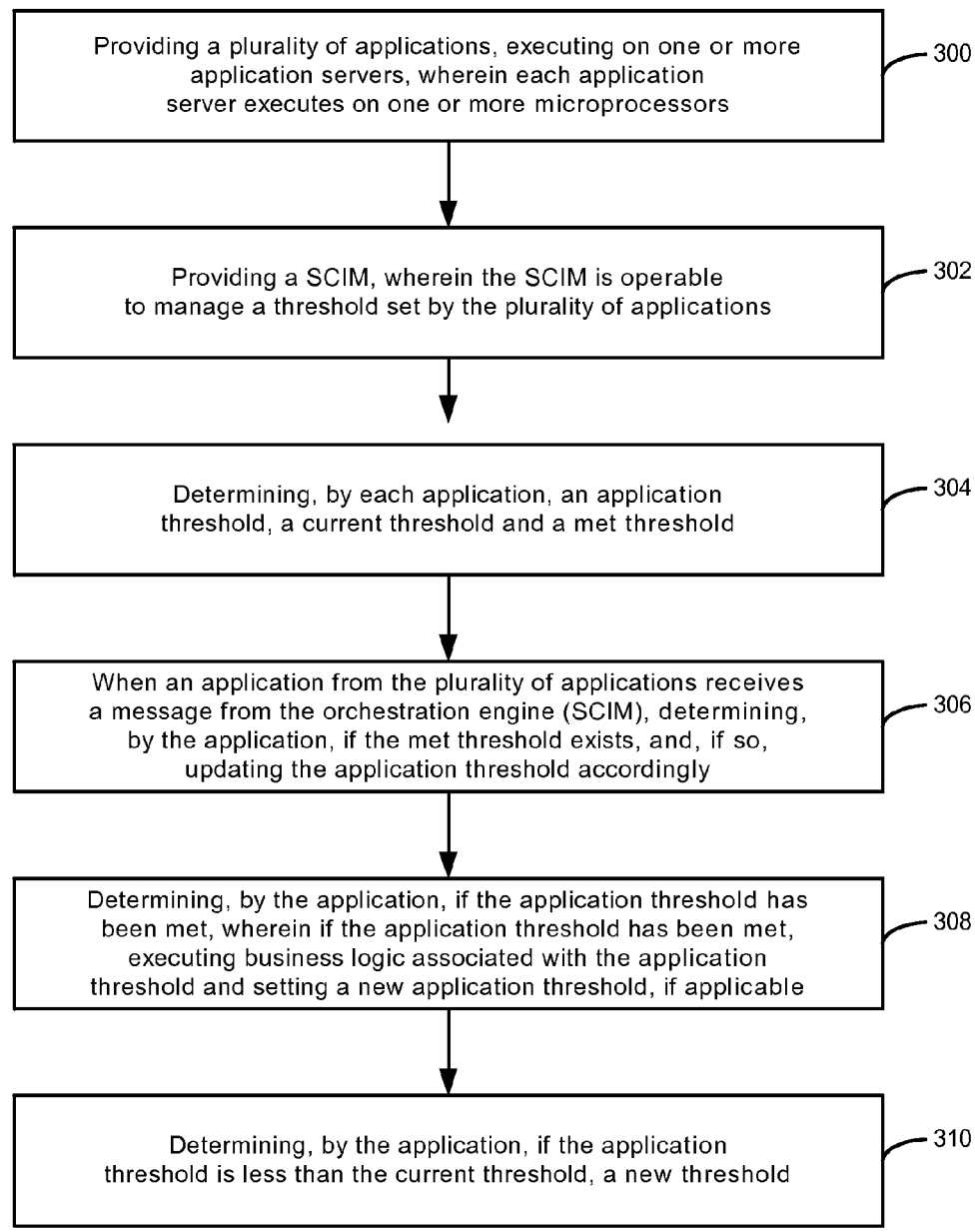
FIG. 3 shows a method for managing threshold values, in accordance with an embodiment of the invention.

FIG. 3 shows a method for managing threshold values, in accordance with an embodiment of the invention. At step 300, a plurality of applications are provided, each application executing on one or more application servers, wherein each application server executes on one or more microprocessors. At step 302, a SCIM is provided. The SCIM is operable to manage a threshold set by the plurality of applications. At step 304, each application can determine an application threshold, a current threshold and a met threshold. At step 306, when an application from the plurality of applications receives a message from the SCIM the application can determine if the met threshold exists and, if the met threshold exists, the application can update the application threshold accordingly. At step 308, the application can determine if the application threshold has been met. If the application threshold has been met, the application can execute business logic associated with the application threshold, and set a new application threshold if applicable. At step 310, the application can compare its application threshold to the current threshold and, if the application threshold is less than the current threshold, send a request to the SCIM requesting a new current threshold value to be set.

In accordance with an embodiment of the invention, in the method shown in FIG. 3, updating the application threshold accordingly can comprise subtracting the met threshold from the application threshold. Additionally, the application threshold has been met if its value is equal to zero, and the application threshold has not been met if its value is equal to or greater than zero. In accordance with another embodiment, sending a request to the SCIM requesting a new current threshold value be set comprises requesting the new current threshold to be a lesser of the current threshold and the application threshold. Each application of the plurality of applications can maintain its own application threshold. Furthermore, the message from the SCIM can include quality of service and location information which the application can use to set a new threshold.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system that integrates threshold management into a Service Capability interaction Manager (SCIM), comprising:
 a plurality of applications, executing on one or more application servers, wherein each application server executes on one or more microprocessors;
 a SCIM configured to manage a current threshold set by the plurality of applications, and to report a reported met threshold; and
 wherein each application maintains an associated application threshold, an associated current threshold indicative of the current threshold set by the plurality of applications at the SCIM, and an associated met threshold indicative of a most resent reported met threshold reported by the SCIM;
 wherein based on an application from the plurality of applications receiving a message from the SCIM including the reported met threshold, the application:
  updates the associated application threshold accordingly in response to the reported met threshold,
  determines, in response to the reported met threshold, if the associated application threshold has been met, and
  if the associated application threshold has been met, executes business logic associated with the associated application threshold and sets a new associated application threshold, and sends a request to the SCIM requesting a new current threshold value be set.

2. The system of claim 1, wherein based on an application from the plurality of applications receiving a message from the SCIM including the reported met threshold, the application updates the associated application threshold by subtracting the reported met threshold from the associated application threshold.

3. The system of claim 1, wherein the associated application threshold has been met if a value of the associated application threshold is equal to zero.

4. The system of claim 1, wherein the associated application threshold has not been met if a value of the associated application threshold is equal to greater than zero.

5. The system of claim 1, wherein the new current threshold is requested to be a lesser of the associated current threshold and the associated application threshold.

6. The system of claim 1, wherein the message from the SCIM includes at least one of quality of service information and location information which the application can use to set the new associated application threshold.

7. The system of claim 1, wherein the message from the SCIM includes additional information such as quality of service and location information which the application can use to set a new associated application threshold.

8. A method that integrates threshold management into a Service Capability Interaction Manager (SCIM), comprising:
 providing a plurality of applications, executing on one or more application servers, wherein each application server executes on one or more microprocessors;
 providing a SCIM configured to manage a current threshold set by the plurality of applications, and to report a reported met threshold;
 maintaining, by each application, an associated application threshold, an associated current threshold indicative of the current threshold set by the plurality of applications at the SCIM, and an associated met threshold indicative of a most recent reported met threshold reported by the SCIM; and
 based on an application from the plurality of applications receiving a message from the SCIM
  updating the associated application threshold accordingly in response to the reported met threshold,
  determining, in response to the reported met threshold, by the application, if the associated application threshold has been met, and
  if the associated application threshold has been met, executing business logic associated with the associated application threshold, setting a new associated application threshold, and sending a request to the SCIM requesting a new current threshold value be set.

9. The method of claim 8, wherein updating the associated application threshold accordingly comprises subtracting the reported met threshold from the associated application threshold.

10. The method of claim 8, wherein the associated application threshold has been met if a value of the associated application threshold is equal to zero.

11. The method of claim 8, wherein the associated application threshold has not been met if a value of the associated application threshold is equal to greater than zero.

12. The method of claim 8, wherein sending a request to the SCIM requesting a new current threshold value be set comprises requesting the new current threshold be set to be a lesser of the associated current threshold and the associated application threshold.

13. The method of claim 8, wherein the message from the SCIM includes at least one of quality of service information and location information which the application uses to set the new associated application threshold.

14. The method of claim 8, wherein the message from the SCIM includes additional information such as quality of service and location information which the application can use to set a new associated application threshold.

15. A non-transitory computer readable storage medium including instructions stored thereon which, when executed by a computer, cause the computer to perform steps comprising:
   providing a plurality of applications, executing on one or more application servers, wherein each application server executes on one or more microprocessors;
   providing a Service Capability Interaction Manager (SCIM), wherein the SCIM is operable to manage a threshold set by the plurality of applications;
   maintaining by each application, an associated application threshold, an associated current threshold indicative of the current threshold set by the plurality of applications at the SCIM, and an associated met threshold indicative of a most recent reported met threshold reported by the SCIM; and
   based on an application from the plurality of applications
      receiving a message from the SCIM
      updating the associated application threshold accordingly in response to the reported met threshold,
      determining, in response to the reported met threshold, by the application, if the associated application threshold has been met, and
      if the associated application threshold has been met, executing business logic associated with the associated application threshold, setting a new associated application threshold, and sending a request to the SCIM requesting a new current threshold value be set.

16. The non-transitory computer readable storage medium of claim 15, wherein updating the associated application threshold accordingly comprises subtracting the reported met threshold from the associated application threshold.

17. The non-transitory computer readable storage medium of claim 15, wherein the associated application threshold has been met if a value of the associated application threshold is equal to zero and wherein the associated application threshold has not been met if the value of the associated application threshold is equal to greater than zero.

18. The non-transitory computer readable storage medium of claim 15, wherein sending a request to the SCIM requesting a new current threshold value be set comprises requesting the new current threshold be set to be a lesser of the associated current threshold and the associated application threshold.

19. The non-transitory computer readable storage medium of claim 15, wherein the message from the SCIM includes at least one of quality of service information and location information which the application uses to set the new associated application threshold.

20. The non-transitory computer readable storage medium of claim 15, wherein the message from the SCIM includes additional information such as quality of service and location information which the application uses to set a new associated application threshold.

* * * * *

UNITED STATES PATENT AND TRADEMARK OFFICE
CERTIFICATE OF CORRECTION

PATENT NO. : 8,924,557 B2  
APPLICATION NO. : 13/584459  
DATED : December 30, 2014  
INVENTOR(S) : Livne et al.

Page 1 of 1

It is certified that error appears in the above-identified patent and that said Letters Patent is hereby corrected as shown below:

On the Title Page, Item (75),

Column 1, under Inventors, line 5, delete "Rosh-Haain" and insert -- Rosh-Haayin --, therefor.

Column 1, under Inventors, line 6, delete "Rechovot" and insert -- Rehovot --, therefor.

Column 1, under Inventors, line 8, delete "Givaataim" and insert -- Givatayim --, therefor.

In the Claims,

In column 6, line 3, in Claim 1, delete "resent" and insert -- recent --, therefor.

Signed and Sealed this
Eighth Day of September, 2015

Michelle K. Lee
*Director of the United States Patent and Trademark Office*